(12) United States Patent
Schwarcz

(10) Patent No.: US 6,708,177 B2
(45) Date of Patent: Mar. 16, 2004

(54) METHOD OF FORMATTING VALUES IN A FIXED NUMBER OF SPACES USING THE JAVA PROGRAMMING LANGUAGE

(75) Inventor: Lawrence R. Schwarcz, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 441 days.

(21) Appl. No.: 09/852,657

(22) Filed: May 11, 2001

(65) Prior Publication Data

US 2002/0198879 A1 Dec. 26, 2002

(51) Int. Cl.[7] .............................................. G06F 17/30
(52) U.S. Cl. ................. 707/100; 707/1; 707/6; 707/101; 717/114; 717/118; 715/504; 715/518; 715/519
(58) Field of Search ................ 707/1, 6, 101, 707/100; 717/114, 118; 715/504, 518, 519

(56) References Cited

U.S. PATENT DOCUMENTS 6,260,083 B1 * 7/2001 Moore et al. ................. 710/33
6,513,002 B1 * 1/2003 Gillam ........................... 704/9

OTHER PUBLICATIONS

Sun Microsystem, "PrintfFormat Source Code", Copyright 2000, downloaded on Sep. 17, 2003 at http://developer.java.sun.com/developer/technicalArticles/Programming/sprintf/PrintfFormat.java.*
Jacobs, Allan, Formatted Printing for Java (sprintf), Oct. 2000, downloaded on Sep. 17, 2003 at http://developer.java.sun.com/developer/technicalArticles/Programming/sprintf/.*
Horstmann, Cay, "Format—printf style formatting for Java", 1998–2000, downloaded on Sep. 17, 2003 at http://www.horstmann.com/articles/format.jar.*

* cited by examiner

Primary Examiner—Jean R. Homere
Assistant Examiner—Khanh Pham

(57) ABSTRACT

A computer implemented method of and apparatus for printing values in a fixed number of column spaces using Java is described. A value desired to be formatted to a predetermined length string and an indexed lookup table having predetermined formatted string entries are used. An index based on the number of characters needed to represent the value is calculated and then used to locate a desired length formatted string entry in the lookup table. The desired length formatted string entry is then combined with a string representation of the value to form a predetermined length string.

18 Claims, 3 Drawing Sheets

METHOD OF FORMATTING VALUES IN A FIXED NUMBER OF SPACES USING THE JAVA PROGRAMMING LANGUAGE

FIELD OF THE INVENTION

The present invention relates generally to a method and apparatus of formatting values; and more particularly, to such a method and apparatus using the Java programming language. Still more particularly, the present invention relates to a method and apparatus to format values in a fixed number of spaces having leading or trailing characters using the Java programming language.

BACKGROUND ART

Java is a programming language designed to generate applications capable of executing on all hardware platforms without modification. Java was originally developed in 1991 by Sun Microsystems, Inc. as a language for embedded applications. Java is an interpreted language wherein the source code is compiled into an intermediate language called bytecode. The bytecode is converted or interpreted into machine code at runtime. Thus, Java programs are not dependent on any specific hardware and run in any computer having a Java virtual machine. The Java programming language includes similar functionality of other programming languages, e.g., C or C++; however, Java does not provide a method to print out formatted lines, e.g., if a programmer wants to print out a table of numbers with several columns with each column of numbers lining up. Currently, this only works if each number uses the same number of columns. If the numbers use differing numbers of columns, the columns of numbers will not line up. For example, the number "3" uses a single column; however, the number "1234" requires four columns. This leads to inconsistent and unpleasant formatting of output, as in Column A of Listing 1 below.

| Column A | Column B |
| --- | --- |
| 12345 | 12345 |
| 2345 | 02345 |
| 345 | 00345 |
| 45 | 00045 |
| 5 | 00005 |

Column B is a formatted output of numeric values wherein the numeric values occupy the same number of digits or spaces, i.e., five spaces in this example. It is important to note that the values in column B which are less than five digits long are padded with zeroes to make them equal lengths.

It is known in the art to use a format string in the C programming language to obtain the above-described format and functionality. For example, to print out a number using five spaces or columns with leading zeroes using the C programming language, a programmer would use the formatting string, "%05d", resulting in the output as shown in Column B of Listing 1. Unfortunately, the present inventor is unaware of any method in the Java programming language for obtaining such functionality using already existing formatting statements. In the context of this document, method and function are used interchangeably.

Instead, to obtain such functionality other approaches have been used including using a series of nested if statements or a looping mechanism; however, these methods are more time consuming, i.e., more processing time is required. The other approaches require a variable amount of time depending on the implementation.

A pseudo code-based example of using nested if statements is shown in Listing 2 below.

If (number=0)
Print 6 zeroes
Else if (number<10)
Print 5 zeroes
Else if (number<100)
Print 4 zeroes
. . .
Listing 2

With respect to Listing 2, "number" is a variable storing the numerical value of the number to be formatted. Listing 2 operates to format the printed version of a numeric value to use a total of six digits or columns, e.g., a value of 55 is to be formatted as 000055 and a value of 5 as 000005. Each pseudo code if statement tests the size of the value of the number in order to format the printed output. For example, if the number is less than the value ten, then only five zeroes need to precede the number in an output to format it as a six digit value because the number is only a single digit, or column, wide. As shown in Listing 2, for small numbers, i.e., numbers having few digits, only a small portion of the if statements are executed. However, for larger numbers, it is possible that each of the if statements may need to be executed to properly format the output. This is problematic as it requires a variable amount of processing time.

Use of a looping mechanism is similarly flawed requiring an unknown amount of processing to format a number. In using a loop structure, the number of zeroes to precede the number is determined by subtracting the size in characters of the number to be printed from the number of columns or digits desired in the formatted output. A loop would then be executed a number of iterations equal to the number of zeroes determined and during each pass through the loop the character "0" is added to a target string. Once the loop completes execution, the original number, as a character, is appended to the target string, as well.

A pseudo code-based example of using a loop is shown in Listing 3 below.

Num_of_zeroes=num_of_cols_to_use-size_(in_chars)_of_num_to_print
Loop for Num_of_zeroes iterations copying a "0" char to a target_string
Append num_to_print to target_string . . .
Listing 3

Num_of_zeroes is a variable containing a numeric value representing the number of zeroes to be output before the number to be printed. Num_of_cols_to_use is a variable containing a numeric value representing the number of output columns to be used by the formatted number. Size_(in_chars)_of_num_to_print is the character-based size of the numeric value to be printed or output. Target string is a string storing the formatted output number. As with the nested if statements approach described above, a variable amount of processing time is required to execute the loop-based formatting approach. Therefore, there is a need in the art for a method of printing formatted lines using the Java language requiring a predetermined amount of processing time.

Another approach has been to use or "callout" a separate function or library programmed in a different language, e.g., the C programming language, to execute the formatting statement, i.e., the C format "%05d" statement described above. However, because there is a large amount of overhead or additional processing required to setup and perform such a callout in the Java language, there is a large performance and resource penalty. It is known to be very inefficient to callout to a separate function or library from within Java in comparison to performing the same function in Java. Thus, there is a need in the art for a Java-based formatting function requiring minimal additional processing overhead.

When resources, e.g., processor time and memory, are constrained, it is important to minimize the resource requirements. For example, in a web site or web server environment, the resources used to format printing reduces the resources available for serving customers or traffic to a web site. This means it is important to reduce the resource usage of the formatting function.

DISCLOSURE/SUMMARY OF THE INVENTION

It is therefore an object of the present invention to provide a method of printing formatted lines using the Java language requiring a predetermined amount of processing time.

Another object of the present invention is to provide a Java-based formatting function requiring minimal additional processing overhead.

The above described objects are fulfilled by a computer implemented method of and apparatus for printing values in a fixed number of column spaces using Java. A value desired to be formatted to a predetermined length string and an indexed lookup table having predetermined formatted string entries are used. An index based on the number of characters needed to represent the value is calculated and then used to locate a desired length formatted string entry in the lookup table. The desired length formatted string entry is then combined with a string representation of the value to form a predetermined length string.

A computer implemented Java-based method aspect of formatting a value to a predetermined length string uses a lookup table. An index is calculated based on the number of characters required to represent the value. A desired length formatted string is obtained from the lookup table using the index. The desired length formatted string is combined with a string representation of the value to form a predetermined length string. In a further embodiment, the index is calculated based on the predetermining length of the predetermined length string and the maximum length of the lookup table entries. Uniquely, the method requires a constant determinable amount of processing time to perform the formatting.

A computer system for formatting a value to a predetermined length string using a lookup table includes a processor for receiving and transmitting data and a memory coupled to the processor. The memory has stored sequences of Java-based instructions which, when executed by the processor, cause the processor to calculate an index based on the number of characters required to represent the value. Further, the instructions cause the processor to locate a desired length formatted string in the lookup table using the calculated index and combine the desired length formatted string with a string representation of the value, thus forming a predetermined length formatted string. Advantageously, because the instructions are Java-based there is minimal additional processing required to callout to a separate non-Java-based function.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for creating formatted output lines using the Java programming language are described. In the following description, for purposes of explanation, numerous specific details are set forth in order to provide a thorough understanding of the present invention. It will be apparent; however, that the present invention may be practiced without these specific details. In other instances, well-known structures and devices are shown in block diagram form in order to avoid unnecessarily obscuring the present invention.

Top Level Description

The present invention, i.e., a method using Java-based programming, is invoked and provided as input a numeric value and a specified size, e.g., number of character positions desired in the output. The method converts the numeric value to a string, i.e., a string representation of the numeric value, and prepends a number of predefined leading characters to create the desired formatted output string of a length equal to the specified size. The number of leading characters to be prepended is determined through the use of an index in conjunction with a predetermined lookup table where the index is based on the specified size and the length of the string version of the numeric value submitted. A detailed description of the present invention is now provided.

Functional

Figures 1, 2:
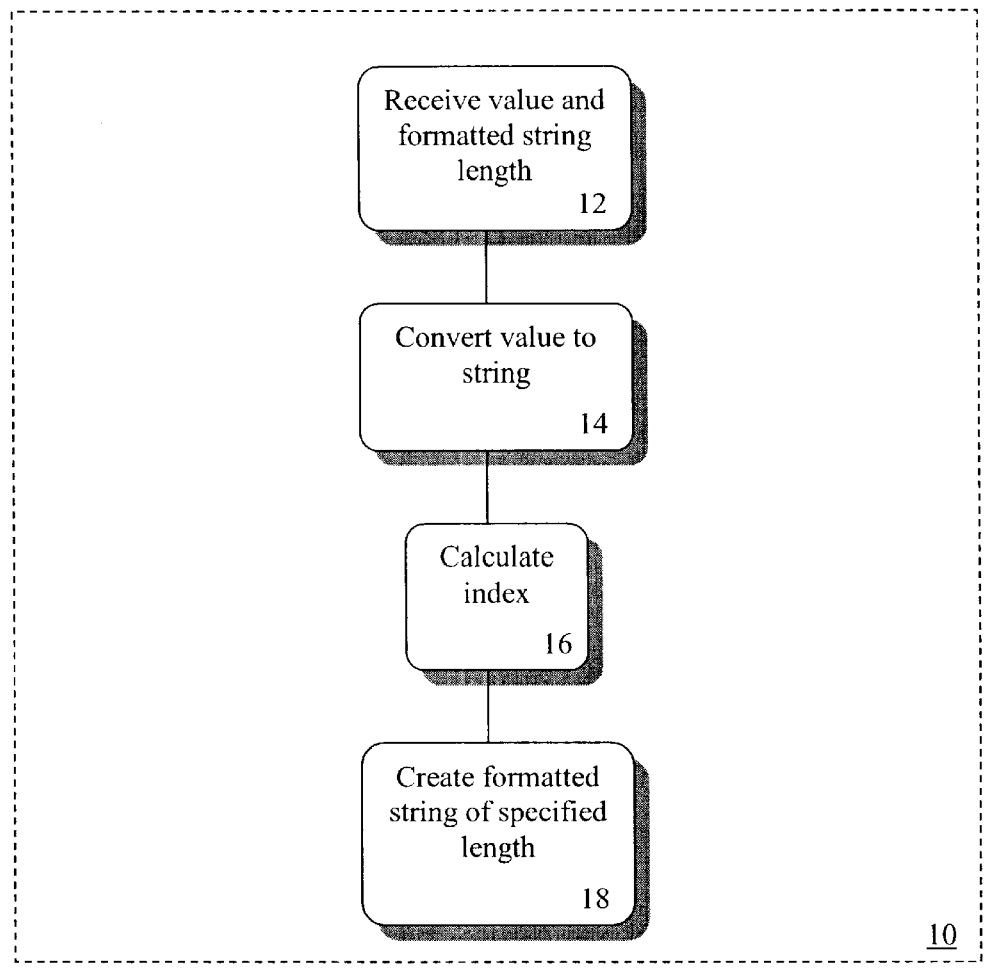
FIG. 1 is a functional flow diagram of an embodiment of the present invention.
FIG. 2 is an example lookup table as used in an embodiment of the present invention.

FIG. 1 is a high level functional flow diagram of a formatting method 10 executing on a computer system 20, described in detail with reference to FIG. 2 below.

The flow of control begins at step 12 wherein formatting method 10 is invoked by a method call and is provided with two values as input at step 12: a numeric value to be formatted and a numeric value defining the length of the desired formatted string. As is known in the art, the values are passed by value. The numeric value, i.e., number-to-be-padded, is an integer type to be converted to a string type and the second numeric value, i.e., columns-to-use, is an integer type specifying the number of columns the converted and padded number-to-be-padded will use. Even though the term columns is used herein it is to be understood that columns is meant to indicate fixed format character spaces to be used in outputting the resulting formatted string.

Upon receipt of the numeric values at step 12, the flow of control proceeds to step 14 and converts the number-to-be-padded numeric value to a string type, i.e., a string representation of the numeric value. The conversion of the integer type number-to-be-padded is accomplished using a standard Java method for integer types, i.e., the toString( ) method, as is known in the art. The toString method converts the integer type to a string type, e.g., integer type value 67 is converted to a string type value "67" or an array of character type values "6" and "7". The flow proceeds to step 16.

In step 16, an index into a lookup table, described in detail below, is calculated using the columns-to-use numeric value and a predefined numeric value for the maximum width of the formatted string type outputted by the formatting method 10. After calculating the index, the flow of control proceeds to step 18.

The lookup table entry, i.e., the specified string length, corresponding to the index calculated in step 16 is then retrieved and used to format the formatting method output string in step 18. The lookup table entry value, e.g., a character string such as "000", is then added to the string type of the number-to-be-padded to obtain the formatted string of the required length or size of characters.

FIG. 2 is an illustration of a lookup table 20 as used in an embodiment of the present invention. Lookup table 20, also referred to as padding array table, is stored in memory, e.g., main memory 36 or storage device 40 described below, and includes two columns of values: (a) an index column 22 and (b) a value column 24. The entries of lookup table 20, i.e., index column 22 and value column 24, are fixed and predetermined. The index column entries are integer values representing the calculated index of step 16 and the value column entries represent a string of the number of zero characters needed to be added to a value to ensure the desired output format. The index calculated in step 16 (FIG. 1) is used to locate the desired entry in index column 22 and the corresponding value in value column 24. For example, a calculated index value of 3 corresponds to the lookup table value column entry of "000" as indicated by reference numeral 26. A more detailed example is provided below.

It is to be understood that different index column 22 and value column 24 entries may be used in alternate embodiments, e.g., if the padding is to be an underscore character, the strings in the value column 24 would include the appropriate length strings of underscore characters. Further, in the example shown in FIG. 2, the maximum number of digits in the number to be formatted is set to six digits. The maximum number of digits possible in the output format may be increased by increasing the number of entries in the lookup table 20, e.g., for a seven digit output format the value column entry strings would all obtain an additional zero character and an additional entry having an index column entry of seven and a value column entry of no characters would be added.

Further, if necessary, the value column entry may be either prepended or postpended to the string to be formatted, as dictated by the output format needed.

It is to be further understood that the value received by the formatting method 10 may be a floating point or other alphanumeric output having a string representation. For example, the numeric value 123.45 can be represented as a string value "123.45" requiring six digits and may be formatted using the present inventive formatting method 10.

Additionally, an additional test may be performed to determine if the value to be output is a negative value requiring an additional column. If the number is negative, the index used in lookup table 20 is decremented by one to obtain one digit or column shorter string to be used in creating the output formatted string.

Hardware Overview

Figure 3:
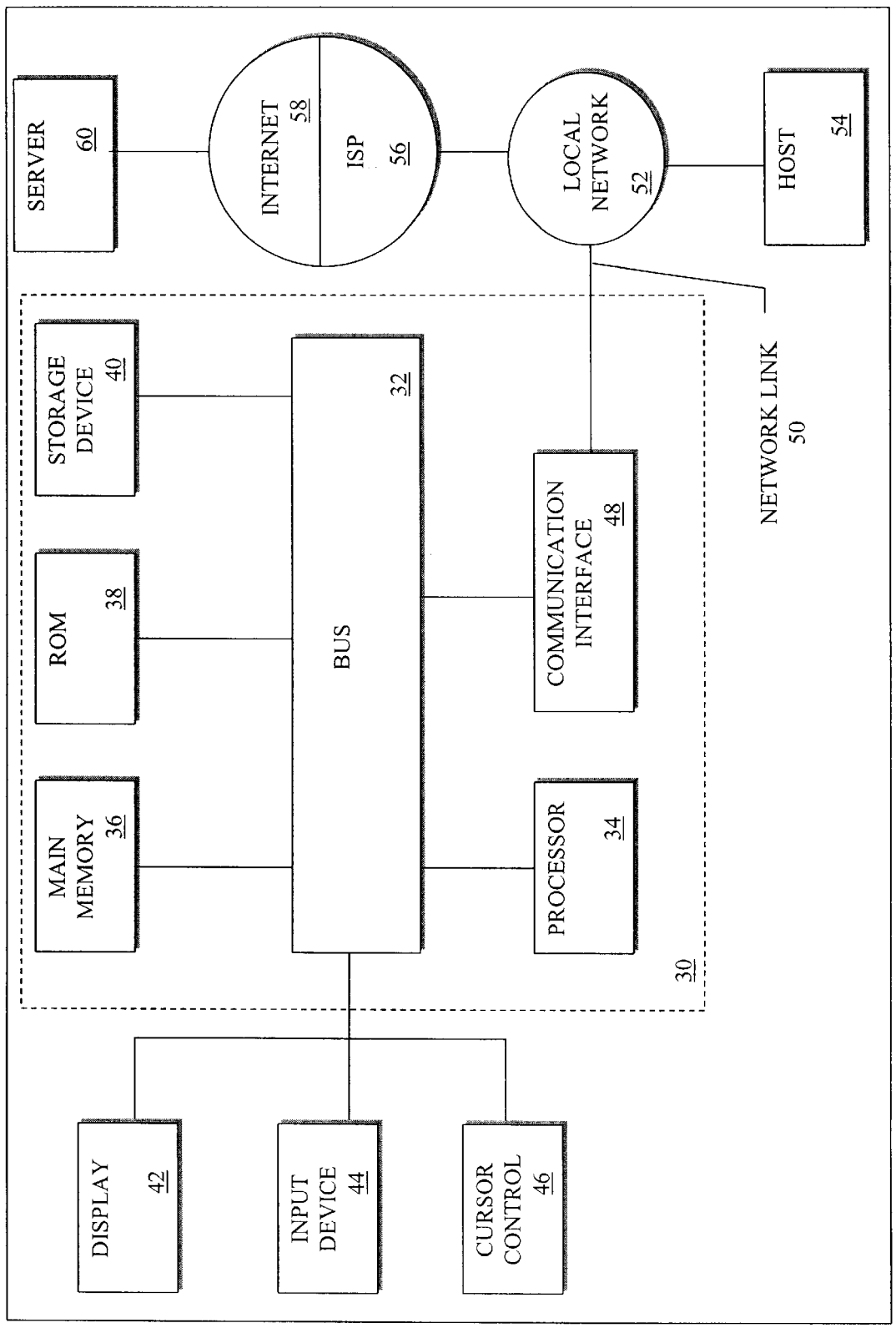
FIG. 3 is a top level block diagram of a computer system usable with an embodiment of the present invention.

FIG. 3 is a block diagram illustrating an exemplary computer system 30 upon which an embodiment of the invention may be implemented. The present invention is usable with currently available personal computers, mini-mainframes, enterprise servers, multiprocessor computers and the like.

Computer system 30 includes a bus 32 or other communication mechanism for communicating information, and a processor 34 coupled with the bus 32 for processing information. Computer system 30 also includes a main memory 36, such as a random access memory (RAM) or other dynamic storage device, coupled to the bus 32 for storing information and instructions to be executed by processor 34. Main memory 36 also may be used for storing temporary variables or other intermediate information during execution of instructions to be executed by processor 34. Computer system 30 further includes a read only memory (ROM) 38 or other static storage device coupled to the bus 32 for storing static information and instructions for the processor 34. A storage device 40, such as a magnetic disk or optical disk, is provided and coupled to the bus 32 for storing information and instructions.

Computer system 30 may be coupled via the bus 32 to a display 42, such as a cathode ray tube (CRT) or a flat panel display, for displaying information to a computer user. An input device 44, including alphanumeric and other keys, is coupled to the bus 32 for communicating information and command selections to the processor 34. Another type of user input device is cursor control 46, such as a mouse, a trackball, or cursor direction keys for communicating direction information and command selections to processor 34 and for controlling cursor movement on the display 42. This input device typically has two degrees of freedom in two axes, a first axis (e.g., x) and a second axis (e.g., y) allowing the device to specify positions in a plane.

The invention is related to the use of a computer system 30, such as the illustrated system, to provide an expression-based mechanism for triggering and testing corner-case exceptional conditions in software and use thereof. According to one embodiment of the invention, a software trigger facility for testing software exceptional conditions is provided by computer system 30 in response to processor 34 executing sequences of instructions contained in main memory 36. Such instructions may be read into main memory 36 from another computer-readable medium, such as storage device 40. However, the computer-readable medium is not limited to devices such as storage device 40.

For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 36 causes the processor 34 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 30 also includes a communication interface 48 coupled to the bus 32. Communication interface 48 provides a two-way data communication as is known. For example, communication interface 48 may be an integrated services digital network (ISDN) card, a digital subscriber line (DSL), or a modem to provide a data communication connection to a corresponding type of telephone line. As another example, communication interface 48 may be a local area network (LAN) card to provide a data communication connection to a compatible LAN. Wireless links may also be implemented. In any such implementation, communication interface 48 sends and receives electrical, electromagnetic or optical signals which carry digital data streams representing various types of information. Of particular note, the communications through interface 48 may permit transmission or receipt of the operating software program scheduling information. For example, two or more computer systems 30 may be networked together in a conventional manner with each using the communication interface 48.

Network link 50 typically provides data communication through one or more networks to other data devices. For example, network link 50 may provide a connection through local network 52 to a host computer 54 or to data equipment operated by an Internet Service Provider (ISP) 56. ISP 56 in turn provides data communication services through the world wide packet data communication services through the world wide packet data communication network now commonly referred to as the "Internet" 58. Local network 52 and Internet 58 both use electrical, electromagnetic or optical signals which carry digital data streams. The signals through the various networks and the signals on network link 50 and through communication interface 48, which carry the digital data to and from computer system 30, are exemplary forms of carrier waves transporting the information.

Computer system 30 can send messages and receive data, including program code, through the network(s), network link 50 and communication interface 48. In the Internet example, a server 60 might transmit a requested code for an application program through Internet 58, ISP 56, local network 52 and communication interface 48. In accordance with the invention, one such downloaded application provides for an expression-based mechanism for triggering and testing exceptional conditions in software and use thereof, as described herein.

The received code may be executed by processor 34 as it is received, and/or stored in storage device 40, or other non-volatile storage for later execution. In this manner, computer system 30 may obtain application code in the form of a carrier wave.

EXAMPLE

Figure 4:
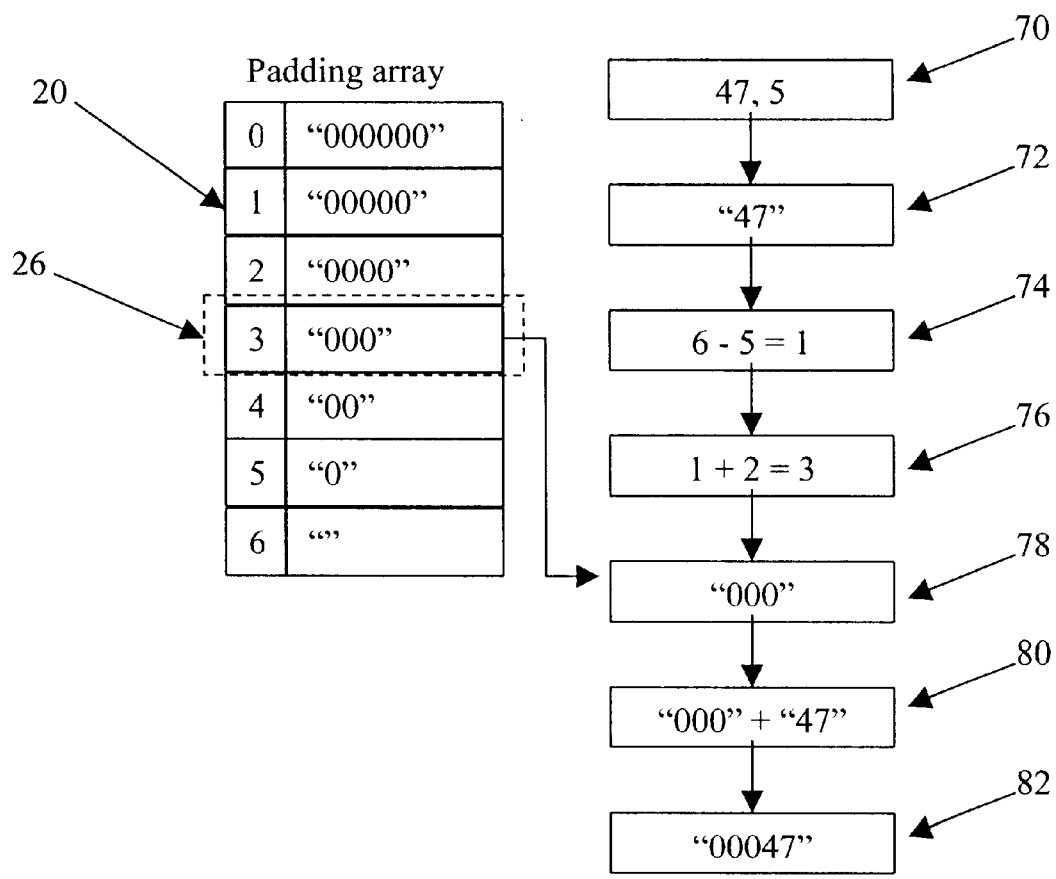
FIG. 4 is a functional flow diagram of an example using an embodiment of the present invention.

FIG. 4 is a high level flow diagram of an example of use of an embodiment of the present invention. FIG. 4 is now described with reference, as appropriate, to the flow diagram of FIG. 2.

At step 70, a numeric value of 47 and size numeric value of 5 are received by the formatting method 10 to be formatted. The size numeric value specifies that the formatted output will be five digits long. The flow proceeds to step 72 wherein the integer value is converted, according to step 14 (FIG. 1), to a string value, i.e., "47". In steps 74 and 76 the index into the lookup table 20 is calculated, as follows: in step 74, the desired number of digits in the output format, i.e., five, is subtracted from the maximum number of digits handled by lookup table 20, i.e., six, and in step 76, the result is added to the number of digits present in the string value of the number to be formatted, i.e., "47" uses two digits. The index resulting from steps 74 and 76 is a value of three which is then used in conjunction with lookup table 20 to obtain the corresponding value entry, i.e., in this case "000", as shown in step 78 . The flow proceeds to step 80 wherein the value entry from the lookup table 20 is added to the string value and the result is shown in step 82 as "00047". The resulting output formatted string uses five digits.

Advantageously, the present invention provides a method of printing formatted lines using the Java language requiring a predetermined amount of processing time. Further advantageously, the present invention provides a Java-based formatting function requiring no additional processing overhead.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer implemented Java-based method of formatting a value to a predetermined length string using a lookup table comprising the following steps:

calculating an index based on the number of characters required to represent the value;

locating a desired length formatted string in the lookup table using the index; and combining the desired length formatted string and a string representation of the value to form a predetermined length string.

2. The method as claimed in claim 1 comprising the further step of: outputting said predetermined length string.

3. The method as claimed in claim 1 wherein the desired length formatted string includes a predetermined number of characters.

4. The method as claimed in claim 1 wherein said combining step includes prepending the desired length formatted string to the string representation.

5. The method as claimed in claim 1 wherein said combining step includes postpending the desired length formatted string to the string representation.

6. The method as claimed in claim 1 wherein the value is an alphanumeric character.

7. The method as claimed in claim 1 wherein the value is a numeric value.

8. The method as claimed in claim 1 wherein said calculating step further includes calculating the index based on the predetermined length of the predetermined length string.

9. The method as claimed in claim 8 wherein said calculating step further includes calculating the index based on the maximum length of the lookup table entries.

10. A computer system for formatting a value to a predetermined length string using a lookup table comprising:

a processor for receiving and transmitting data; and a memory coupled to said processor, said memory having stored therein sequences of Java-based instructions which, when executed by said processor, cause said processor to calculate an index based on the number of characters required to represent the value, to locate a desired length formatted string in the lookup table using the index, and to combine the desired length formatted string and a string representation of the value to form a predetermined length string.

11. The computer system as claimed in claim 10 wherein the memory further comprises instructions, which when executed by the processor, cause the processor to output the predetermined length string.

12. The computer system as claimed in claim 10 wherein the desired length formatted string includes a predetermined number of characters.

13. The computer system as claimed in claim 10 wherein the instructions causing said processor to combine the desired length formatted string and the string representation include prepending the desired length formatted string to the string representation.

14. The computer system as claimed in claim 10 wherein the instructions causing said processor to combine the desired length formatted string and the string representation include postpending the desired length formatted string to the string representation.

15. The computer system as claimed in claim 10 wherein the value is an alphanumeric character.

16. The computer system as claimed in claim 10 wherein the value is a numeric value.

17. The computer system as claimed in claim 10 wherein the instructions causing said processor to calculate the index further includes instructions causing said processor to calculate the index based on the predetermined length of the predetermined length string.

18. The computer system as claimed in claim 17 wherein the instructions causing said processor to calculate the index further includes instructions causing said processor to calculate the index based on the maximum length of the lookup table entries.

* * * * *